United States Patent
Fox et al.

(10) Patent No.: US 11,237,848 B2
(45) Date of Patent: Feb. 1, 2022

(54) VIEW PLAYBACK TO ENHANCE COLLABORATION AND COMMENTS

(71) Applicant: Microsoft Technology Licensing, LLC, Redmond, WA (US)

(72) Inventors: Seth Fox, Seattle, WA (US); Erez Kikin Gil, Bellevue, WA (US); Daniel P. Costenaro, Kirkland, WA (US); Christopher Andrews Jung, Mercer Island, WA (US); Benjamin D. Smith, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 16/278,616

(22) Filed: Feb. 18, 2019

(65) Prior Publication Data

US 2020/0264905 A1    Aug. 20, 2020

(51) Int. Cl.
*G06F 9/451* (2018.01)
*G06F 3/0481* (2013.01)
(Continued)

(52) U.S. Cl.
CPC ............ *G06F 9/451* (2018.02); *G06F 3/0481* (2013.01); *G06F 3/04842* (2013.01); *G06F 3/167* (2013.01); *G06F 3/048* (2013.01); *G06F 40/166* (2020.01); *G06F 40/169* (2020.01); *G06Q 10/103* (2013.01)

(58) Field of Classification Search
CPC .... G06F 9/451; G06F 3/0481; G06F 3/04842; G06F 3/167; G06F 40/169; G06F 3/048; G06F 40/166; G06Q 10/103
See application file for complete search history.

(56) References Cited

U.S. PATENT DOCUMENTS

2006/0026502 A1* 2/2006 Dutta .................. H04L 12/1822
                                                                715/230
2007/0266304 A1* 11/2007 Fletcher ................ G06F 40/169
                                                                715/230
(Continued)

OTHER PUBLICATIONS

"International Search Report and Written Opinion issued in PCT Application No. PCT/US20/016686", dated May 29, 2020, 13 Pages.

*Primary Examiner* — Tuyetlien T Tran
(74) *Attorney, Agent, or Firm* — Schwegman Lundberg & Woessner, P.A.

(57) ABSTRACT

Collaborator content selection and manipulation actions and comments during interaction with a document are recorded to enhance asynchronous collaboration. The collaborator content selection and manipulation actions and comments are recorded during interaction with a document in a first collaboration viewport at a first time and played back in a second collaboration viewport at a second time while the same or a different instance of the document is displayed. The collaborator content selection and manipulation actions and comments include at least text selection, mouse or pen movements, and voice comments or ink annotations that are played back to recreate the collaborator changes and comments as though they were occurring in real-time, thereby creating a user experience that is more like the "over the shoulder" collaboration that would be available to collaborators that are at the same physical location.

18 Claims, 14 Drawing Sheets

(51) Int. Cl.
  *G06F 3/0484* (2013.01)
  *G06F 3/16* (2006.01)
  G06F 40/169 (2020.01)
  G06F 40/166 (2020.01)
  G06F 3/048 (2013.01)
  G06Q 10/10 (2012.01)

(56) References Cited

U.S. PATENT DOCUMENTS

| | | | |
|---|---|---|---|
| 2009/0300520 A1* | 12/2009 | Ashutosh | H04L 12/1831 |
| | | | 715/756 |
| 2010/0332980 A1 | 12/2010 | Sun et al. | |
| 2012/0166952 A1* | 6/2012 | Alexandrov | G06Q 10/101 |
| | | | 715/730 |
| 2013/0055113 A1* | 2/2013 | Chazin | H04L 12/1822 |
| | | | 715/758 |
| 2015/0149540 A1 | 5/2015 | Barker et al. | |
| 2015/0248388 A1* | 9/2015 | Chen | H04L 67/10 |
| | | | 715/230 |
| 2015/0341399 A1 | 11/2015 | Lee | |
| 2017/0046113 A1* | 2/2017 | Noyes | H04L 65/4015 |

* cited by examiner

VIEW PLAYBACK TO ENHANCE COLLABORATION AND COMMENTS

BACKGROUND

Conventional document collaboration solutions may require synchronous collaboration via a separate application. For example, during a Skype® call or a Teams™ call (both available from Microsoft Corporation), a participant in the call may share her computer screen so that other participants may follow along as she modifies a document while orally explaining the changes. The other participants may take notes and use features of the Skype® or Teams™ applications to record screenshots and to record audio and/or video versions of the conversation. While the recordings may be shared, such sharing occurs via a separate communication stream since the recordings are recorded and maintained in a separate application from the application including the document that was the subject of the call. The audio/video playback does not illustrate the navigation that occurs in the document itself as the audio/video is recorded. Also, the recording of the screen is rasterized content so it does not adjust when content is changed, support different scroll/zoom positions, and may be difficult to describe to assistive technologies.

In other document collaboration solutions, a participant may pause during an explanation of a modification so that two or more collaborators may modify the same content. In such a case, the live document is accessible by all participants, but any recording of the comments is overlaid on top of the original document. For example, a collaboration system has been described that records ink annotations in the form of a comment card associated with a portion of the document. The user may play back the ink annotation on the displayed document and may modify and/or delete the ink annotation during playback. A "show annotation" control element is also provided that enables a user to overlay the ink annotation on the document such that the document may be displayed with the ink annotation and a comment card associated with a portion of the document. While an ink annotation may be played back, it remains difficult for a collaborator that was not present for the original collaboration to understand the flow of comments and changes to the document that occurred during the collaboration. The collaborator reviewing the document at a later time may not be able to understand how to synchronize the comments and the changes to understand the reasons for the proposed changes.

Also, other methods of collaboration such as comments and email notes that require reading and writing by collaborators do not have mechanisms to support high fidelity recording and low effort communication features like voice and screen capture that would facilitate more efficient collaboration.

SUMMARY

Various details for the embodiments of the inventive subject matter are provided in the accompanying drawings and in the detailed description text below.

The following description outlines a technique that enables rich conversations amongst collaborators within a document via comments. The systems and methods described herein support screen recording and playback of document edits and comments by capturing collaborator selections, mouse or pen movements, text modification, and voice during editing of a document. The captured recording may be played back by other collaborators to enable more natural and fluid conversations about a document not only during synchronous collaboration but also during asynchronous collaboration. Voice recordings of the collaborators may be transcribed for playback in an office setting or in a mobile setting to minimize audio disruptions. The techniques described herein further allow collaborators to naturally communicate and to gesture around different document sections where the communications and gestures are captured for native viewing by other collaborators during synchronous or asynchronous collaboration. For example, the collaborators may play back the document edits and watch the document section be modified as the pointer moves around the screen and the collaborator provides oral comments explaining the reasons for the changes. Since the changes are recorded, the change file may be played back repeatedly and from different starting points, as desired.

In sample embodiments, the methods described herein provide techniques for recording and playing back collaborator content selection and manipulation actions and comments during interaction with a document to enhance asynchronous collaboration. The method includes recording collaborator content selection and manipulation actions and comments during interaction with a document in a first collaboration viewport at a first time and playing back the recorded collaborator content selection and manipulation actions while displaying the document in a second collaboration viewport at a second time. In sample embodiments, the collaborator content selection and manipulation actions and comments include at least text selection, mouse or pen movements, and voice comments or ink annotations. The method may further include capturing a screen view and playing backing the collaborator content selection and manipulation actions and comments while displaying the screen view in the second collaboration viewport.

In further implementations of the sample embodiments, the collaborator content selection and manipulation actions and comments are recorded during interaction with the document in the first collaboration viewport for a first form factor on a first device. During playback, the screen view is formatted for a second form factor on a second device to enable playing back the recorded collaborator content selection and manipulation actions while viewing the document in the second collaboration viewport on the second device. Similarly, the collaborator content selection and manipulation actions and comments may be recorded during interaction with the document in the first collaboration viewport in a first window whereby, during playback, the screen view is formatted for a second window to enable playing back the recorded collaborator content selection and manipulation actions while viewing the document in the second collaboration viewport in the second window. When playing back the recorded collaborator editing actions in the second viewport or window, the original instance or a second instance of the document may be displayed.

In still further implementations of the sample embodiments, recording collaborator content selection and manipulation actions and comments during interaction with a document may include transcribing a collaborator's voice as content selection and manipulation actions are being made by the collaborator. During playback, the recorded content selection and manipulation actions on the document are played back as the transcribed collaborator's voice is played back. The playback of the recorded content selection and manipulation actions and comments may occur during the initial collaboration or after completion of editing at least a portion of the document.

Further sample embodiments described herein include a system for recording and playing back collaborator content selection and manipulation actions and comments during interaction with a document to enhance asynchronous collaboration. In sample embodiments, the system includes a client (user) device and a server device. The user device includes a document editor that records collaborator content selection and manipulation actions and comments during interaction with a document in a first collaboration viewport at a first time and a viewer that plays back the recorded collaborator content selection and manipulation actions while displaying the document in a second collaboration viewport at a second time. The collaborator content selection and manipulation actions and comments may include at least text selection, mouse or pen movements, and voice comments or ink annotations. The document editor may further capture a screen view and the viewer may play back the collaborator content selection and manipulation actions and comments while displaying the screen view in the second collaboration viewport. On the other hand, the server device may include a memory and a collaboration server. The memory stores a representation of a document as a string of primitive data structures and update transactions to the primitive data structures, while the collaboration server manages collaboration on a document by at least two collaborators. In sample embodiments, the collaboration server receives recorded collaborator content selection and manipulation actions and comments during interaction with a document by at least one collaborator in a first collaboration viewport at a first time formatted as strings of primitive data structures and update transactions to the primitive data structures. The collaboration server stores the strings of primitive data structures and update transactions to the primitive data structures in the memory and, upon request, retrieves the selected strings of the primitive data structures and update transactions to the primitive data structures for presentation to a viewer that plays back the recorded collaborator content selection and manipulation actions while displaying the document in a second collaboration viewport at a second time. In sample embodiments, the collaborator content selection and manipulation actions and comments include at least text selection, mouse or pen movements, and voice comments or ink annotations.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter. Rather, it will be understood that the following section provides summarized examples of some of the embodiments described in the Detailed Description below.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
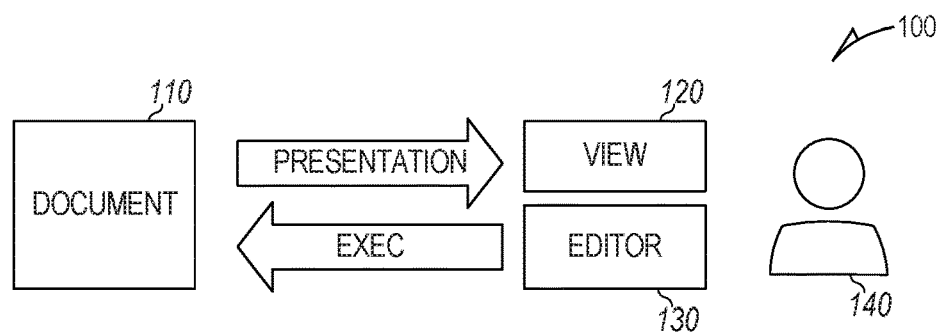
FIG. 1 illustrates a conventional solo document editor.

The following description with respect to FIGS. 1-11 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

The functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

It is desired to create a document collaboration system and method that provides fast, real-time collaboration across all content types while reducing communication barriers to provide a user experience that is more like the "over the shoulder" collaboration that would be available to collaborators that are at the same physical location. It is also desired to make such collaboration available asynchronously as well as synchronously.

The document collaboration system described herein provides fast, real-time collaboration across all content types by enabling recording of each participant's changes to a document along with their oral explanation of the changes and storing same for playback within the document. Playing back the recording replicates the experiences of multiple people in person as the changes were being made in real-time, which is particularly helpful for those team members who were unable to participate in the collaboration in real-time (synchronously). The system described herein records pointer selections, pen inputs, mouse movements and selections, keyboard inputs, voice, and the like as the collaborators work on the document. The participants may watch the changes in real-time or the changes and voice may be packaged as a comment for later review (asynchronously). The playback may be initiated by opening the comment to playback the recording, which shows the participants' content selection and manipulation actions as they occur and transcribes the participants' voices for playback with the content selection and manipulation actions as they occur.

As an example, a user of a collaboration system in a sample embodiment may open a document and invite other collaborators to participate in a document review using document collaboration software. During the collaboration, the user would invite the other collaborators either orally or by using invitation features of the collaboration software to view a specific part of the document. Upon selection of a record function during the collaboration, the document collaboration system would record the conversation of the participants in rich full fidelity. Also, in accordance with exemplary embodiments, the collaboration system would simultaneously record mouse or pen movements (e.g., position and output selections, drawings), keystrokes, and the like of the collaborators to record the changes to the document as they are made. The communications channels used for the recording go beyond typing to include screen capture as well as audio and video transcription. The resulting recording may be stored as an interactable comment in the document and associated with the specific part of the document that was the subject of the collaboration. Then, when viewing the document at a later time, a collaborator may select the comment and play back the recording to see the changes as they were made and also hear the corresponding commentary of the collaboration participants. It is noted that a separate recording may be made for different portions of the document so that collaborators need only play back the recording(s) of interest.

The recording and playback may occur on processing devices having any of a number of available collaboration viewports. For example, the collaboration application described herein may be implemented on a smartphone by notifying the participants by a phone call or by email and accepting responses provided via a "live note." The collaboration would be recorded by the smartphone, including any marks (via, e.g., touchscreen touches or swipes) and changes entered into the shared document. The collaborator's comments and document changes are stored in a comment in the document for later playback. Thus, the process described herein is independent of the size or characteristics of the collaboration viewport through which the document is viewed.

The processes described herein are made possible by maintaining a relationship between the participants and a visible collaboration viewport so that the comments from the respective collaborators are tied to the viewport and the document being viewed in the viewport. The recorded changes are made with respect to the viewport and, on playback, illustrate the changes made via the viewport as well as any voice feedback recorded via the viewport. Any pages presented in the viewport are stored in a transaction log in the document and may be scrolled through to reflect the recorded changes as if the changes were being made by the viewer in real-time. The recordings are time-stamped so that inputs from all collaborators may be synched to a common time line and page location to simulate the changes as if they were made by the original user. Thus, feedback from one collaborator may be auditory only and still be synchronized to the page locations where changes are made by other collaborators so that on playback the recording simulates the full collaboration.

In an alternative embodiment, the viewport may be recorded and embedded in the document on a platform ledger. The changes made by each collaborator would be tracked in the platform ledger from the beginning of the recording to synchronize the audio/video with the changes as they are being made. The resulting recording thus shows the sequence of operations in time as though they were occurring in real-time.

FIG. 1 illustrates a conventional solo document editor 100. As illustrated, a document 110 is presented to a user's screen for display by a viewer 120. Any edits to the document 110 made by the user 140 via keystrokes, mouse, pen, etc. are captured by document editor 130, which modifies the content of the document 110 based on the received inputs for presentation by the viewer 120.

Figure 2:
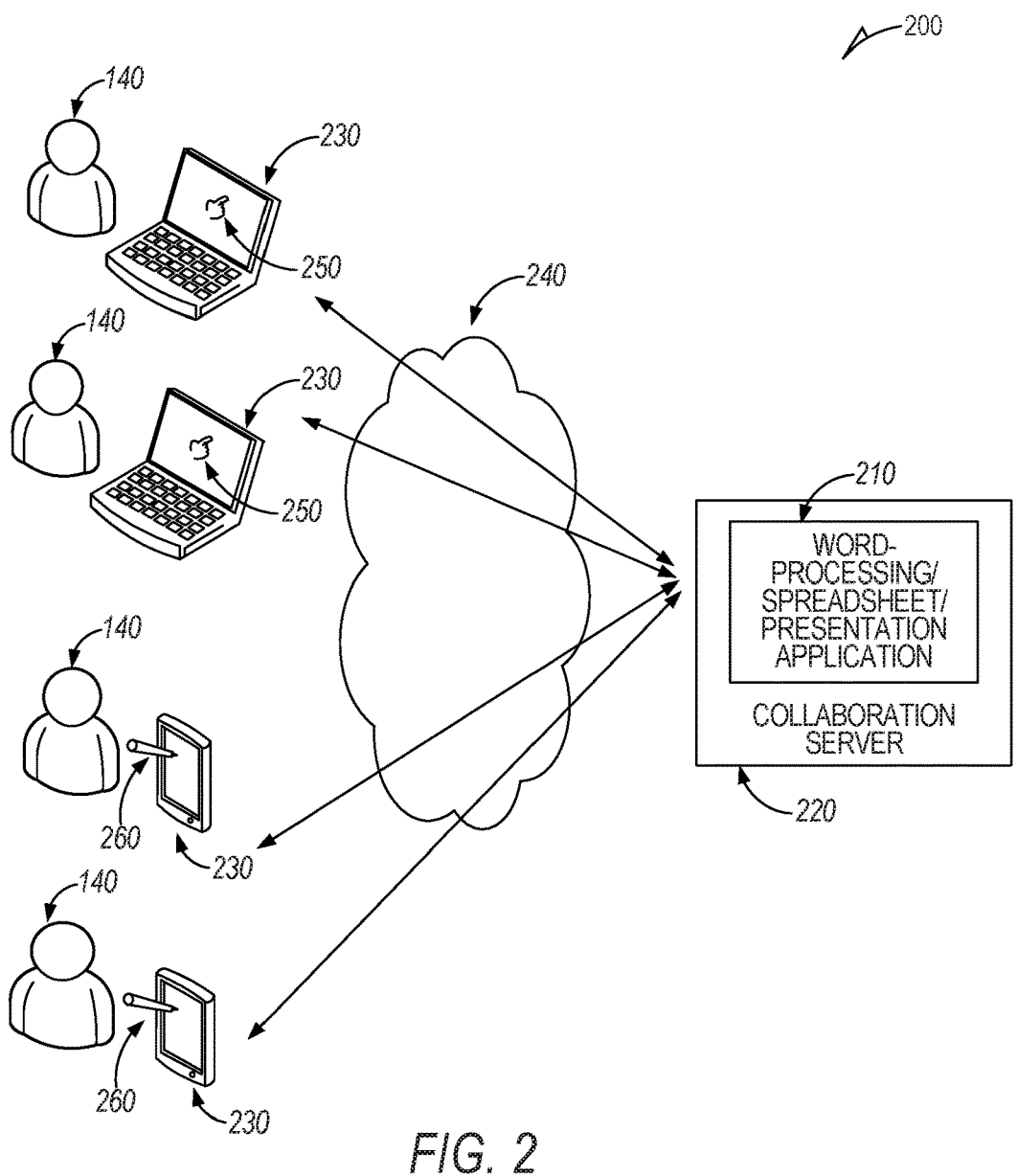
FIG. 2 illustrates a conceptual diagram of a networked document collaboration system.

On the other hand, in the case of a collaboration editor, the edits must be captured by a viewport for all collaborators to see. FIG. 2 illustrates a conceptual diagram of a networked document collaboration system 200. In FIG. 2, an application 210 such as a word-processing, a spreadsheet, or a presentation application may be provided on a collaboration server 220 to enable one or more collaborators 140A, 140B, 140C, and 140D to create, view, edit, share, and present documents. The collaborators 140A-140D may execute the application 210 on one or more client devices 230A-230D such as a desktop, a laptop, a smart phone, a tablet, or other similar computing device. Collaborators 140A-140D may collaborate on documents to co-author and annotate shared documents. The documents are shared amongst the collaborators 140A-140D over a communications network 240, such as the Internet to enable collaboration and co-authoring.

In one embodiment, a first collaborator 140A may execute the application 210 on a touch-enabled laptop computer 230A to view, edit, share, and/or present a document prepared by a second collaborator 1403. Upon execution of the application 210, the application 210 may present the document to the first collaborator 140A for ink annotation of a portion of the document using touch inputs such as a finger 250 or a stylus pen 260, gesture inputs, voice recognition, typing, eye-tracking, and the like. Other text-based comments may be inserted into the documents through traditional methods such as on-screen keyboard, pen, and/or mouse inputs. Changes to the document are managed by the application 210 and shared with other collaborators. As will be described in more detail below, embodiments of the system described herein allow, for example, collaborator 140A to edit the document and make a recording while collaborators 1403 and 140C collaborate in real-time. Collaborator 140D would be able to watch the playback of the recording that collaborator 140A made at a later time.

Figure 3:
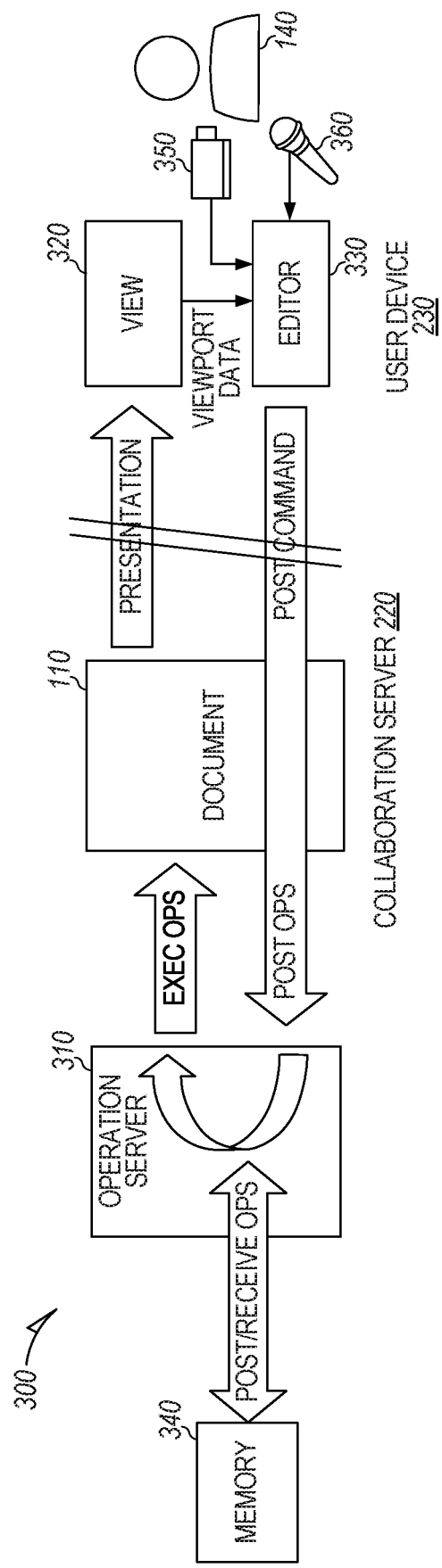
FIG. 3 illustrates a collaboration system that enables rich conversations amongst collaborators within a document in a sample embodiment.

FIG. 3 illustrates a collaboration system 300 that enables rich conversations amongst collaborators within a document in a sample embodiment. FIG. 3 illustrates a collaboration system 300 that differs in at least four fundamental ways from the solo editor 100 of FIG. 1. First, the viewport presented by viewer 320 is made available to multiple viewers. This functionality is available in several collaboration systems including the aforementioned Skype® and Teams™ systems available from Microsoft Corporation. Second, the document editor 330 converts collaborator edits into transaction updates to the primitive data structures (a.k.a. "command ops") making up the document 110. The command ops are posted to an operation server 310 that executes the command ops to change the corresponding primitive data structures of the document 110. Third, the command ops are time stamped and stored in a memory 340 as a record of the transaction updates made to the document 110. Fourth, audio and/or video data from the collaborator 140 is captured by a microphone 360 and/or a video camera 350 and provided to the memory 340 for storage with the command ops taken during the same time frame. In sample embodiments, the audio/video data may be stored as Binary Large Objects (BLOBs) that are time-synchronized with the command ops provided to the memory 340 by the document editor 330. In sample embodiments, the viewer 320, document editor 330, microphone 360, and video camera are available on the user device 230, while the document 110, memory 340, and operation server 310 are located at the collaboration server 220.

In a sample embodiment, recording and playback of changes to the document is enabled by recording the changes to the document as a time-ordered stream of command ops. In sample embodiments, the command ops are expressions of a document change from a given frame of reference, typically a primitive data structure. The document 110 is thus defined by a sequence of command ops as the document 110 is created and modified. The command ops modify the existing document state to reflect the change to the document 110 included in each command op. A particular string of command ops may be selected for playback from the complete string of command ops making up the document.

For example, as a document is being created, the steps to create it (insert text here, create a table, populate rows with A, B, C, etc.) are recorded as respective command ops. The contents of the recording make up the data structure that supports the document editing experience. The contents of the document are stored as a string of command ops in a transactional log. The document's transactional log can be split at any time into two or more documents so that the document creation/editing may continue forward in two (or many) different branches of the same document. This behavior is analogous to a "Save As" function in Microsoft's WORD—a copy is made and then further changes are made separately in each copy of the document. A branch is a bit closer as the changes are stored in the same document, but as two different parallel operational logs. As a result, features like reintegrating parts of one of the branches into the first one may be accomplished. As an example, personal notes in a branch of the document may be saved back into the main document. In another embodiment, a collaborator may make a branch of a document that only the collaborator sees. This branch is used for the collaborator's personal notes. The collaborator may render/experience the document based on the sum of both the branches by constantly reintegrating the original document changes into the personal branch. In this way, the collaborator may take notes that no one sees while enabling all the changes from the original branch to continue to pour into both the original and into the collaborator's private copy of the document, assuming that the changes made by other collaborators do not conflict with the changes the collaborator made in her private branch.

Within a branch, the document may include an interpretation of the stream of command ops as well as a root map. Maps may be nested in sample embodiments to allow for arbitrarily complex hierarchies. An intelligence map as well as a content map off the root may be determined to maintain the document hierarchy within the respective branches.

Figure 4:
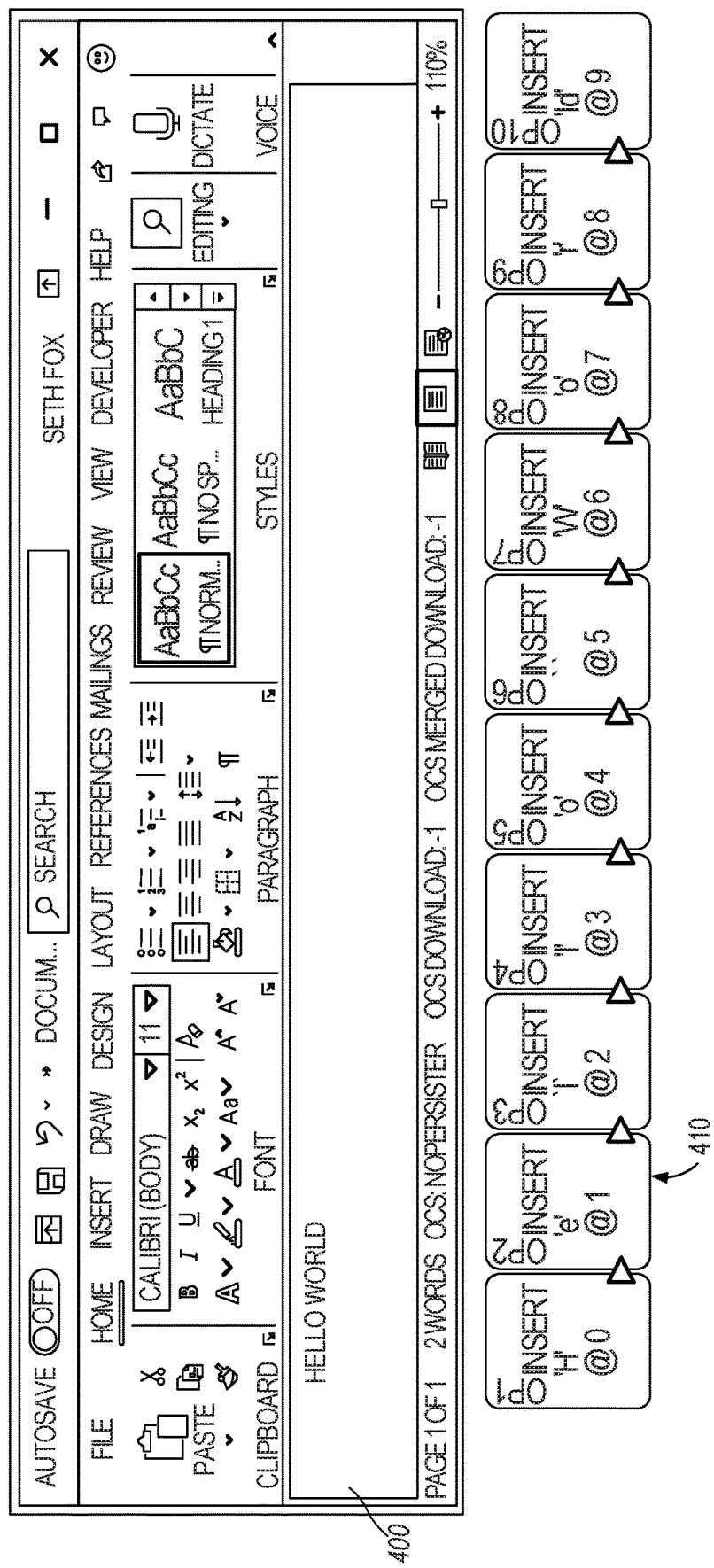
FIG. 4 illustrates a sequence of command ops for inserting the character string "Hello World" into a document in a document editor in a sample embodiment.

As a simple example of the generation of command ops, FIG. 4 illustrates a document editor 400 into which a user has typed "Hello World." In this example, "Hello World" is represented as a sequence of command ops 410 for inserting the character string "Hello World" into a document in the document editor 400. As illustrated, each letter is presented as an "insert" command for inserting a character into a specified location in a character string 410 with the corresponding character(s) in quotations. Similarly, the command may be a command to "create" or "replace" one BLOB object e.g., an audio recording) with another.

A command op is the atomic unit of change to the primitive data structure. For example, "insert at character position 0 of data stream primary" as the first character of typing "hello" would be the first of 5 command ops, one each for 'h', 'e', 'l', 'l', and 'o'. Every character does not have to be recorded as a separate command op as several characters may be combined. For example, in the example of FIG. 4, the characters 'l' and 'd' in "world" are combined into one command op "insert 'ld' at character position 9 of data stream primary." it is beneficial for co-authoring in a real-time collaboration to see every such atomic change being made by others if that is the desired user experience. On the other hand, the collaboration system may be modified to present changes at a less granular level if that is the desired user experience.

Figure 5:
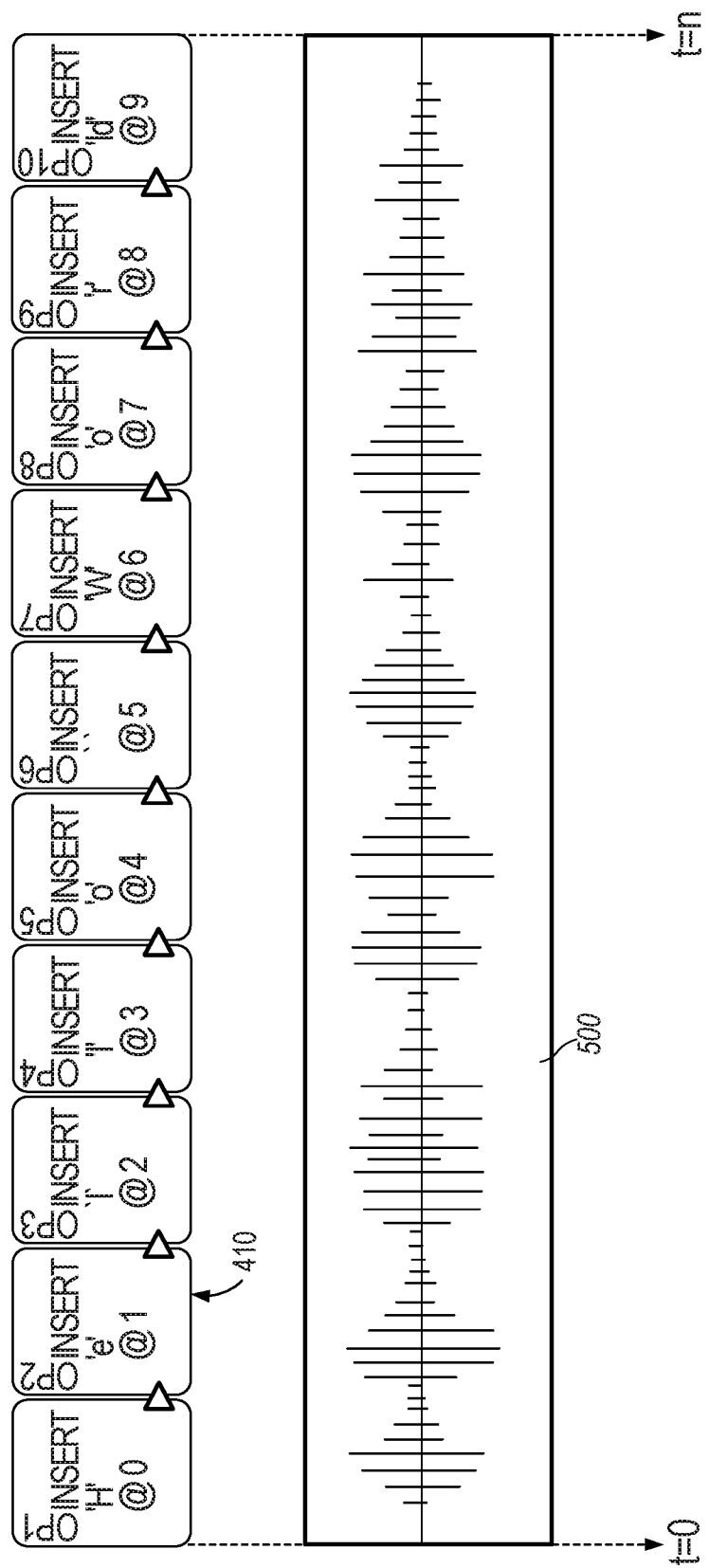
FIG. 5 illustrates the string of command ops for "Hello World" time synchronized with a BLOB representing an audio recording of the collaborator in a sample embodiment.

As noted above, in sample embodiments, the collaboration system 300 not only records document edits using command ops, but also enables collaborators to record audio and/or video of the collaboration for playback with the document edits. The respective document edits and audio/video may be time stamped for synchronous playback. For example, FIG. 5 illustrates the string of command ops 410 for "Hello World" time synchronized with a BLOB 500 representing an audio recording of the collaborator in a sample embodiment.

Figure 6:
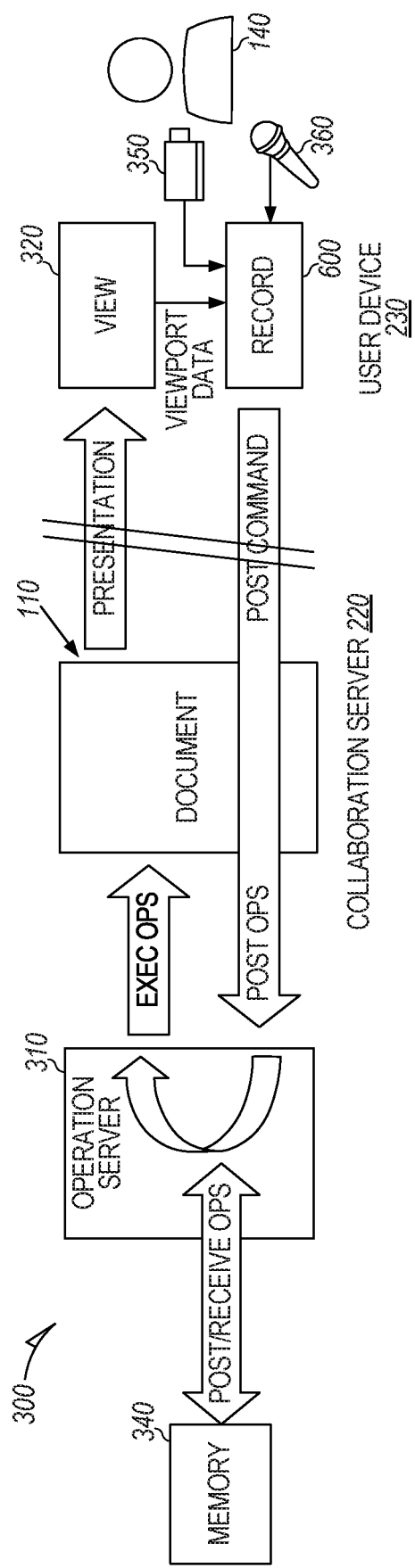
FIG. 6 illustrates the collaboration system of FIG. 3 in record mode in a sample embodiment.

The string of command ops 410 and BLOBs representing audio and/or video recordings of the collaboration may be time stamped and stored in memory 340 for later playback. To initiate this process, the collaborator 140 selects a record feature in the document editor 330. In the record mode, as shown in FIG. 6, the document editor 330 is switched into a record mode 600 and collects audio data from microphone 360 and/or video data from camera 350 during a collaboration. Simultaneously, the document editor 330 captures cursor movements and selections, keystrokes, and document edits and generates command ops that are provided with the recorded audio and/or video data to the memory 340. In addition, viewport data may be provided from the viewer 320 to the document editor 330 so that the size, position, and zoom of the viewport may be provided with the recorded audio and/or video data. Such viewport data enables modification of the viewport during playback when the recorded data is played back on a different form factor (e.g., a smartphone instead of a laptop). Once the recording is completed, the recording is presented as an interactable element (e.g., video comment) on the document 110 for selection by a collaborator in connection with identified text in the document.

Figure 7:
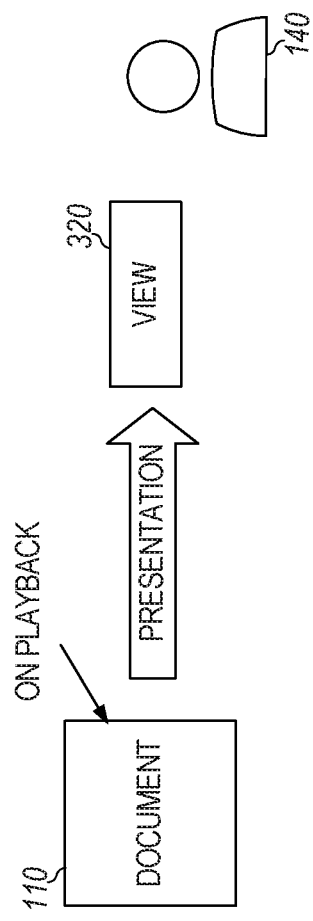
FIG. 7 illustrates the playback of recorded events from a command op stream for playback to a collaborator in a sample embodiment.

To initiate playback of the recording, a collaborator simply activates the interactable element on the document 110 by, for example, double clicking on the interactable element. During playback, the string of command ops 410 and audio and/or video data from the memory 340 are streamed to the viewer 320 as illustrated in FIG. 7. The stream of command ops 410 retrieved from the memory 340 are executed by the operation server 310 for playing back the document changes for presentation to the collaborators via the viewer 320. The presentation may be branched live or may be presented on a static version of the document 110 by the viewer 320. For example, during playback, an application such as a word processing application may simulate a user's actions (edits, selections, pointer use, etc.) within a document synchronized with voice playback. This simulation of user actions may occur on a snapshot of the document when the recording happened or on the document in its current edited form.

In sample embodiments, the operation server 310 may include a typescript component that holds the "state" of the document 110. The operation server 310 may further provide a logical view of the document 110 including any primitive data types, collaborative data types, streams, or shared strings of text as described herein. The operation server 310 may also include the logic required to update the state of the document 110 for the receipt of any command op and to translate application state changes into command ops for broadcast.

The primitive data structures in sample embodiments are not limited to characters or strings. In sample embodiments, the audio and/or video data recorded by microphone 360 and/or video recording device 350 may be provided as primitives in the form of binary large objects ("BLOBs"). Transaction updates for the BLOBS are provided to the operation server 350 for execution in the same fashion as the other transaction updates for the string and character data primitives. The transaction updates for the BLOBs are also time stamped and stored in memory 340 for playback.

Command ops also may be provided that are designed for collaborative data types. For example, a "map" primitive data type may include a key/value store for a basic or collaborative type. The "map primitive data type may be associate with a "put" command op. On the other hand, a "stream" primitive data type may include an append-only stream of data that is associated with a "stream" command op. Also, a "sequence" primitive data type may be backed by a merge tree and associated with an insert, remove, or annotate command op.

Figure 8A:
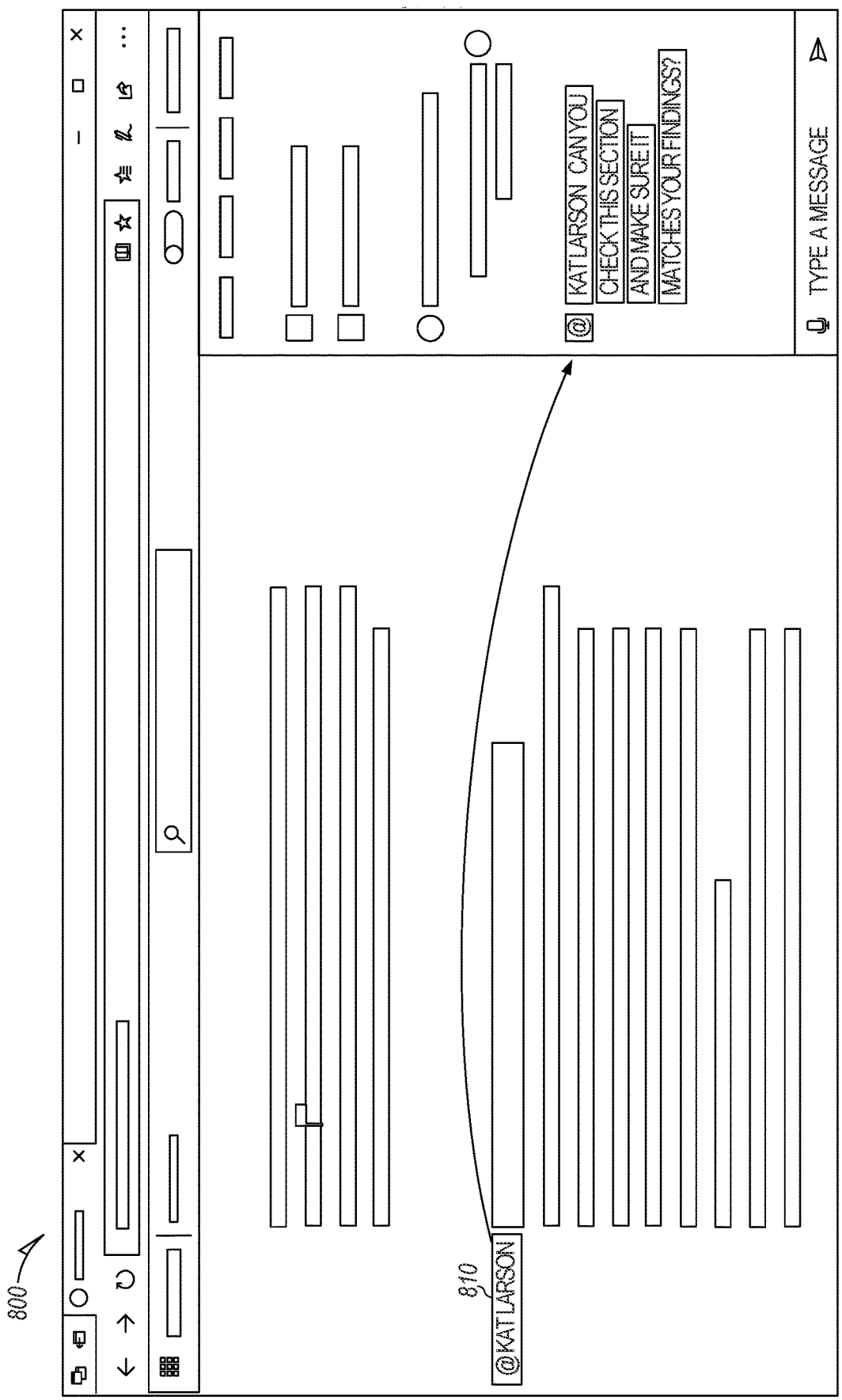
FIG. 8A illustrates a viewport on a desktop or laptop computer that enables a collaborator to invite another collaborator to view and revise a specific portion of the document in a sample embodiment.
Figure 8B:
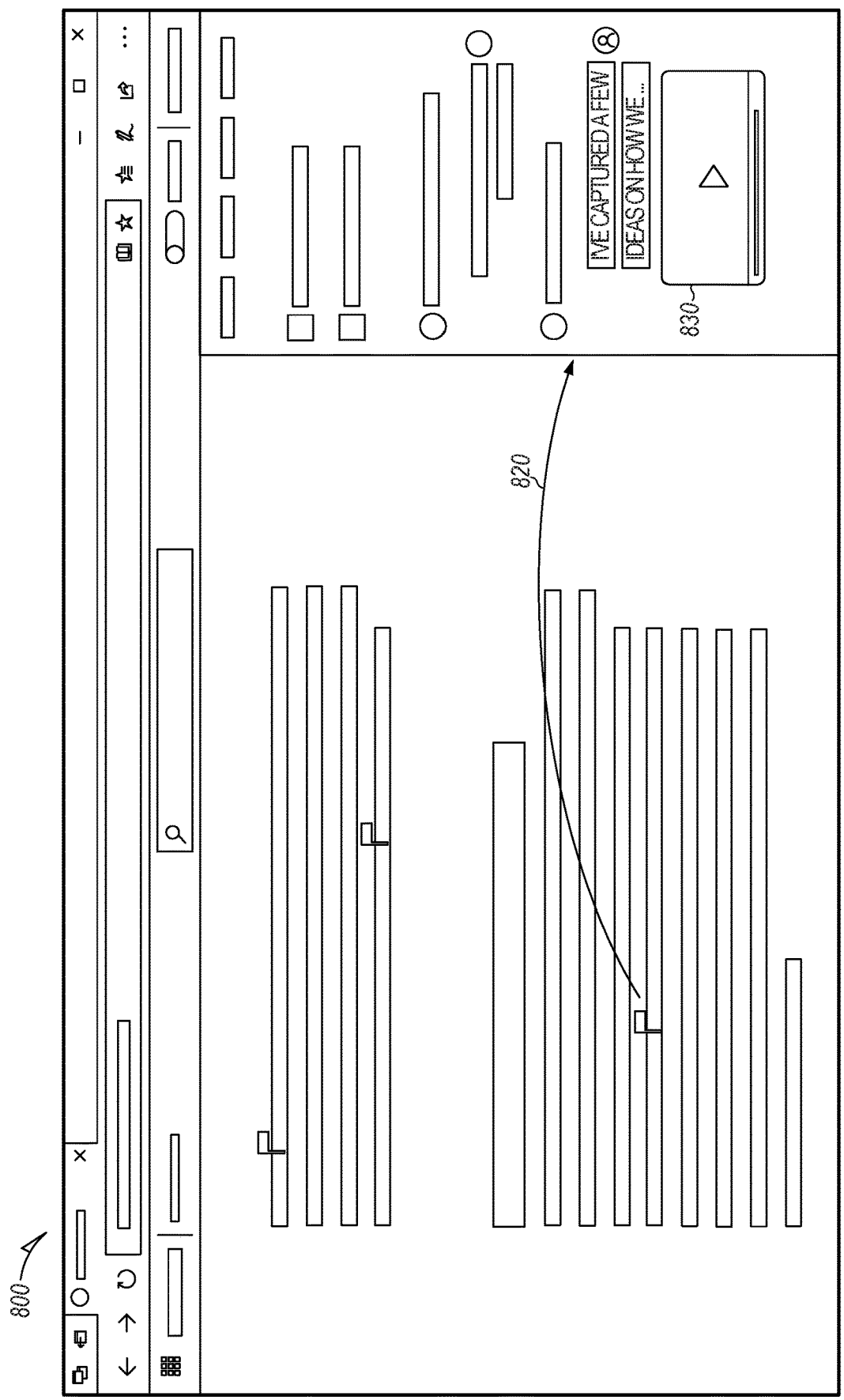
FIG. 8B illustrates a viewport on a desktop or laptop computer that enables a collaborator to respond to another collaborator's invitation with an audio and/or video recording including the revisions made by the collaborator in response to the other collaborator's invitation in a sample embodiment.
Figure 9A:
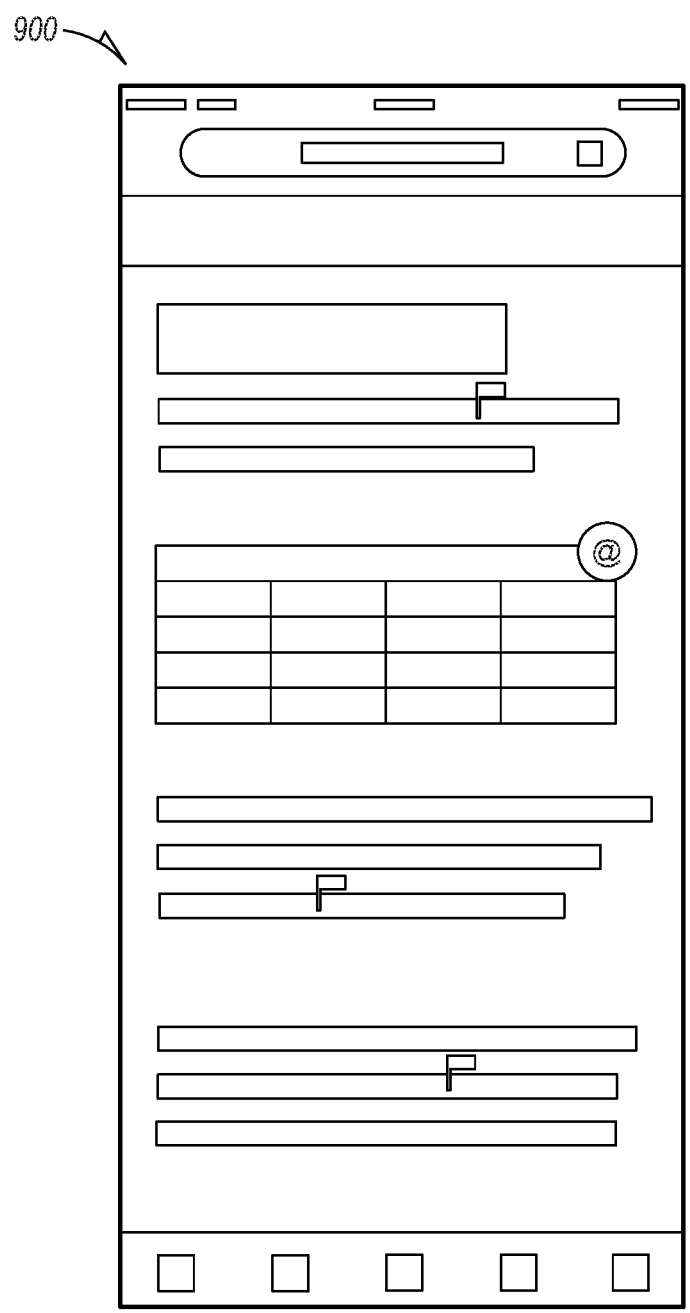
FIG. 9A illustrates a viewport on a smartphone that enables a collaborator to invite another collaborator to view and revise a specific portion of the document in a sample embodiment.
Figure 9B:
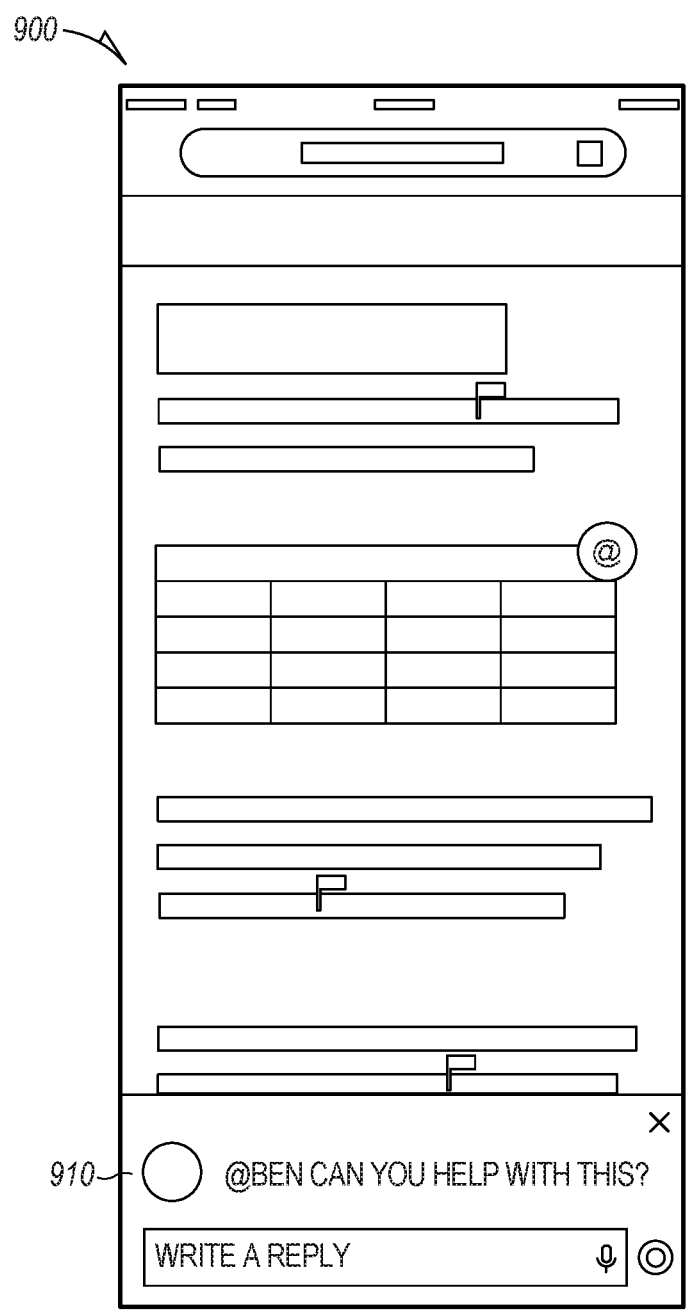
FIG. 9B illustrates the viewport of FIG. 9A with an invitation from a first collaborator to a second collaborator to view and revise a specific portion of the document in a sample embodiment.
Figure 9C:
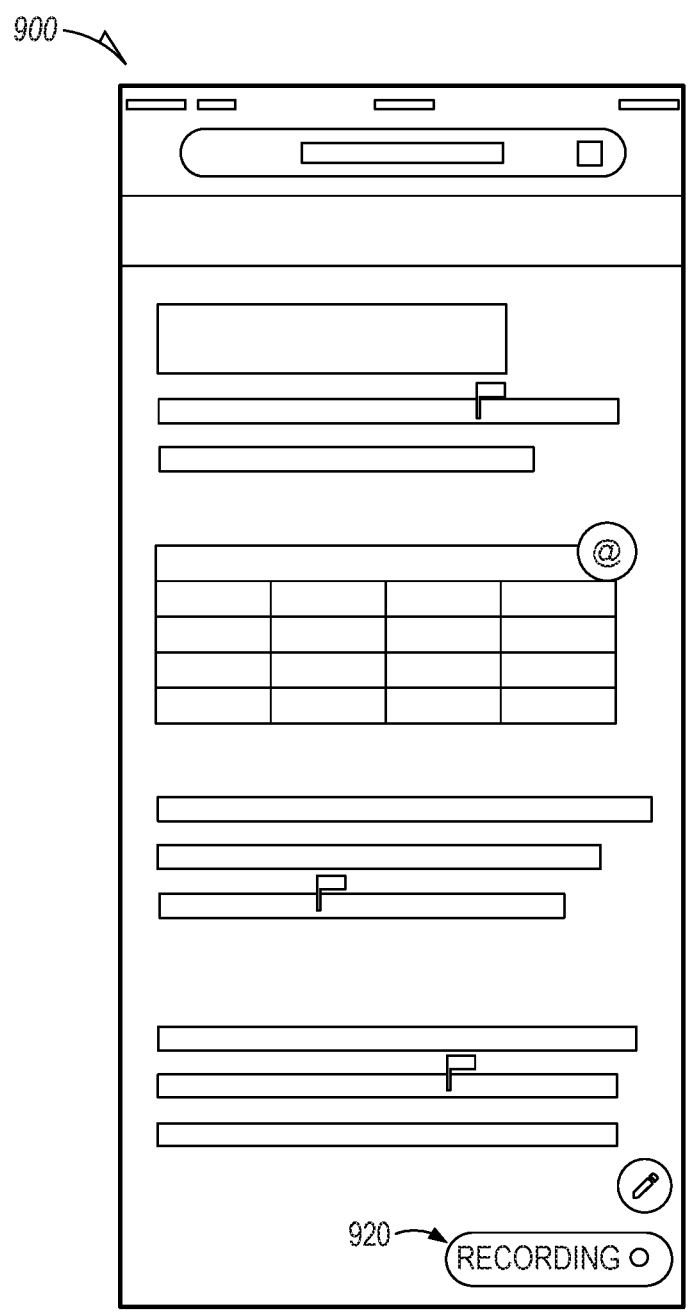
FIG. 9C illustrates the viewport of FIG. 9A where the collaborator has an option to respond to the collaboration request with a recording in a sample embodiment.
Figure 9D:
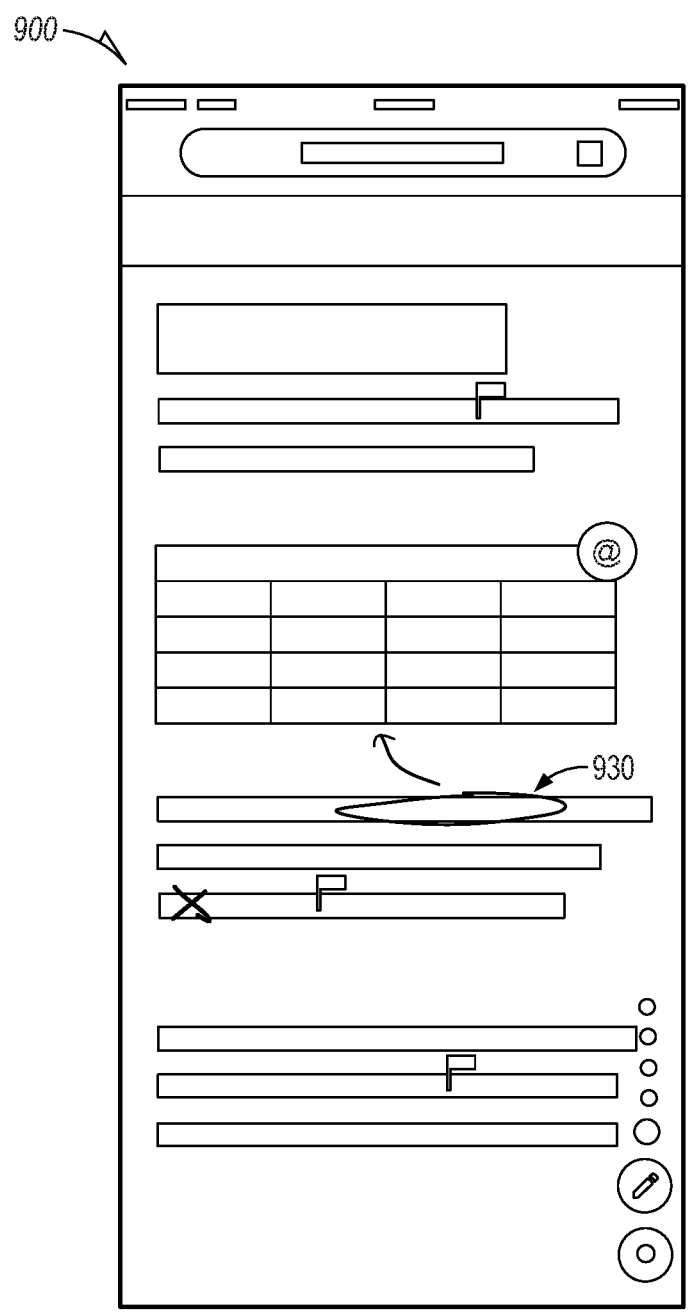
FIG. 9D illustrates the viewport of FIG. 9A where the collaborator responds by circling text during a response to the collaboration request in a sample embodiment.
Figure 9E:
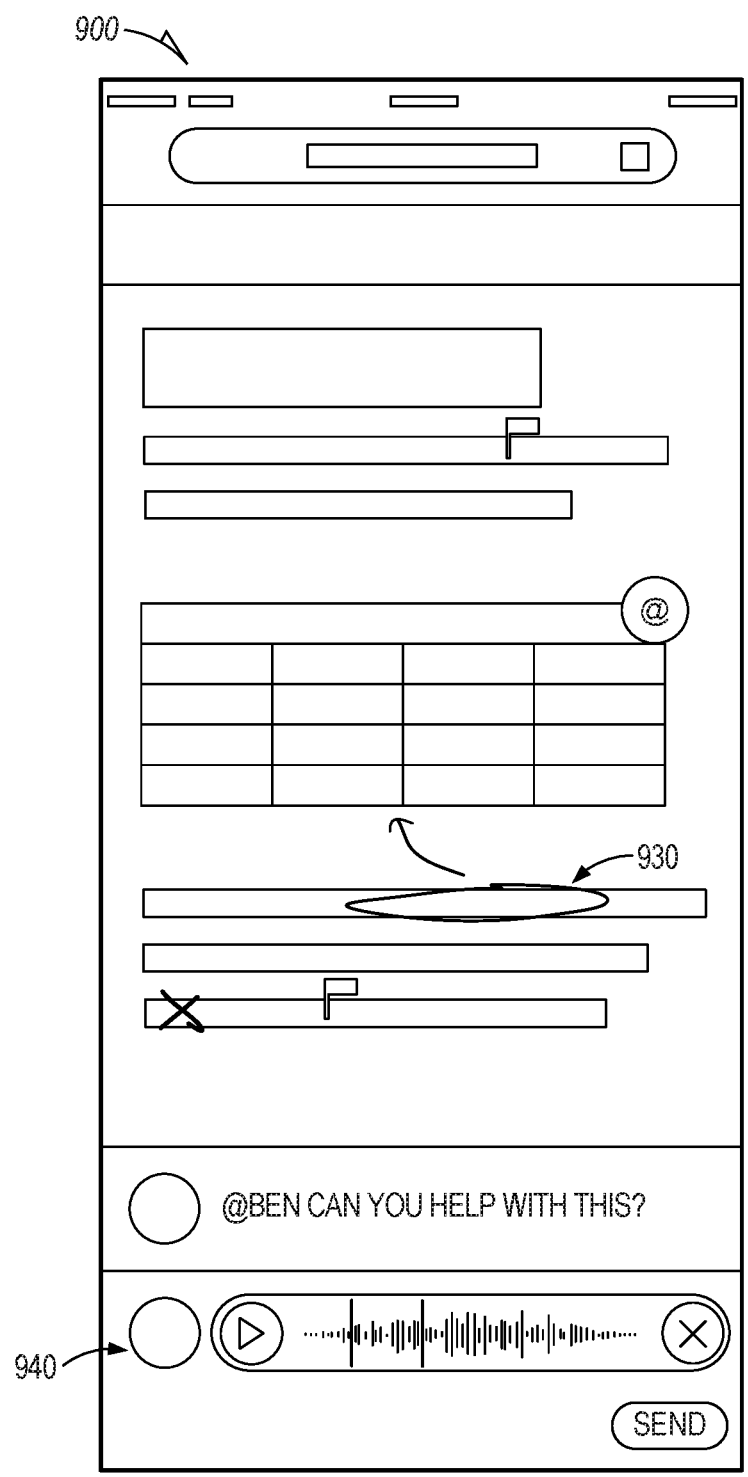
FIG. 9E illustrates the viewport of FIG. 9A illustrating the playback of the second collaborator's audio response while displaying the circled text from FIG. 9D in response to the first collaborator's collaboration request in a sample embodiment.

FIG. 8A illustrates a viewport 800 on a desktop or laptop computer that enables a collaborator to invite another collaborator to view and revise a specific portion of the document in a sample embodiment. The collaborator may identify collaboration peers in a conventional way and invite one or more such collaborators to view a specific part of the document. In this example, a collaborator may insert a comment 810 inviting another collaborator to review a specified section of the document. As collaborators of the collaboration system 300 have the option of responding orally within the document, the collaborator may respond with rich full fidelity conversation as illustrated in FIG. SB by inserting a comment 820 including an audio and/or video recording that may or may not include the revisions made by the collaborator in response to the invitation. The comment with audio and/or video recording is inserted into the document as an interactable element 830 that may be selected for playback. When the interactable element 830 is activated, the audio and/or video recording is played back, and the command ops are executed so that the document scrolls simultaneously to illustrate the changes made to the document. The feedback may occur while the requesting collaborator is still collaborating on the document, or the feedback may occur at a later time when the requesting collaborator is no longer collaborating on the document. In either case, the audio, screen capture, and/or transcription is played back just as it would appear if the later collaborator were watching the changes in real-time and listening to the associated discussion. The collaboration system 300 thus enables asynchronous playback using multiple communication channels beyond mere typing (e.g., screen capture, audio and/or video, and transcription), FIG. 9A illustrates a viewport 900 on a smartphone that enables a first collaborator to invite a second collaborator to view and revise a specific portion of a document in a sample embodiment. In this case, the viewport 900 has less screen space, so rather than inserting a comment in the margin, popups or screen overlays may be used to control the collaboration. For example, FIG. 9B illustrates the viewport 900 with an invitation 910 from a first collaborator to a second collaborator (Ben) asking the second collaborator (Ben) to view and revise a specific portion of the document. As illustrated in FIG. 9C, the second collaborator (Ben) may respond by electing to record a message using "live note" by pressing a record button 920. During the recording, the second collaborator (Ben) may also modify the document as shown in FIG. 9D by, for example, circling text at 930 to emphasize a point. This activity is also recorded using, for example, command ops as described above. As illustrated in FIG. 9E, the corresponding recording may be combined with the document modifications and inserted into the text as an interactable element 940 that may be sent back to the first collaborator for playback. In this case, the second collaborator's (Ben's) audio response would be played while displaying the circled text from FIG. 9D, thereby enriching the playback to the requestor.

Figure 10:
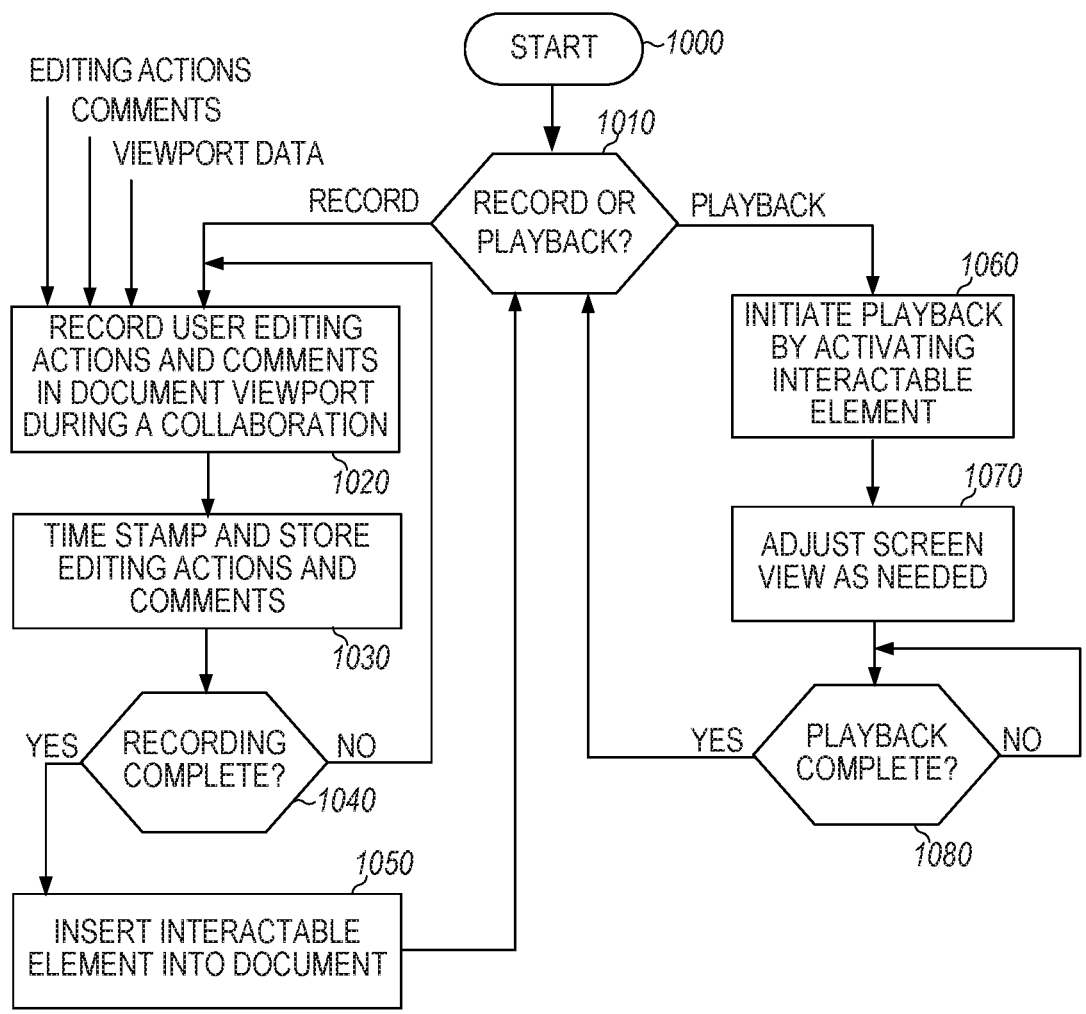
FIG. 10 illustrates a method of recording and playing back collaborator content selection and manipulation actions and comments during interaction with a document to enhance asynchronous collaboration in a sample embodiment.

FIG. 10 illustrates a method of recording and playing back collaborator content selection and manipulation actions and comments during interaction with a document to enhance asynchronous collaboration in a sample embodiment. As illustrated in FIG. 10, the method starts at 1000 and determines at 1010 whether the collaborator has elected to record or playback a collaboration session. If a recording session is elected, the collaboration system 300 records at 1020 the collaborator content selection and manipulation actions and comments during interaction with a document in a collaboration viewport of the collaboration system 300. In sample embodiments, the collaborator content selection and manipulation actions and comments include at least text selection, mouse or pen movements, and transcribing a collaborator's voiced comments as content selection and manipulation actions are being made by the collaborator. The content selection and manipulation actions and comments are time stamped and stored in a memory at 1030. If it is determined at 1040 that the recording is complete, an interactable element including the recording is inserted into the document at 1050. Otherwise, the recording process continues at 1020.

On the other hand, if playback is selected by the collaborator at 1010, the previously recorded collaborator content selection and manipulation actions and comments may be played back at 1060 by, for example, activating the corresponding interactable element in the document. As noted above, the playback may occur during the original collaboration or at a later point in time. For example, a collaborator who missed the recorded collaboration may activate the interactable element to catch up on what she missed, all while viewing the document in the collaborator's viewport on her device. The viewport data enables the size, position, and zoom of the document to be adjusted at 1070 to the form factor of the collaborator's device by formatting the screen view for a form factor of the collaborator's device to the extent it is different from the form factor of the device on which the recording was made. In sample embodiments, the viewports may be windows of different sizes, and the viewport data may enable resizing of the viewport or window of the playback device to adjust to the screen view to accommodate the screen view in the window of the recording device. When viewed at the same time as the collaboration, the playback of a comment may be made within the current document. On the other hand, when viewed at a later time, the recorded collaborator content selection and manipulation actions and comments may be played back in a second viewport or window of a second device while viewing a separate window and instance of the document. Though played back at a later time, the recorded collaborator content selection and manipulation actions are played back while the transcribed collaborator's voice is played back. Also, since the content selection and manipulation actions as well as the comments of each collaborator are tracked individually at each collaborator's client device using, for example, a user and/or device ID associated with the command ops, each collaborator's editing and ink annotations may be recorded and played back independently of the editing and ink annotations of other collaborators. In such case, if a first collaborator made edits and a second collaborator made edits after the first collaborator, the system described herein would allow a third collaborator to view just the edits of the first collaborator or just the edits of the second collaborator during playback. Thus, the recorded collaborator content selection and manipulation actions for each individual collaborator may be played back independently of the selection and manipulation actions of other collaborators after completion of editing of the document. Once the playback is determined at 1080 to be complete, control returns to 1010 for further selections of record or playback.

In summary, the document collaboration application described herein provides fast, real-time collaboration across all content types by enabling recording of each participant's changes to a document along with their oral explanation of the changes and storing same for playback within the document application. Playing back the recording replicates the experiences of multiple people in person as the changes were being made in real-time. The recording enables team members who were unable to participate in the collaboration in real-time (synchronously) to view the collaboration at a later time (asynchronously) including the discussion as well as pointer selections, keyboard inputs, voice, and the like made as the collaborators worked on the document. The document comes alive on playback to show the document edits with collaborator narration, just as would occur if the collaboration were being performed in real-time.

SYSTEM CONFIGURATION

Techniques described herein may be used with one or more of the computer systems described herein and/or with one or more other systems. For example, the various procedures described herein may be implemented with hardware or software, or a combination of both. For example, the processor, memory, storage, output device(s), input device(s), and/or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 11:
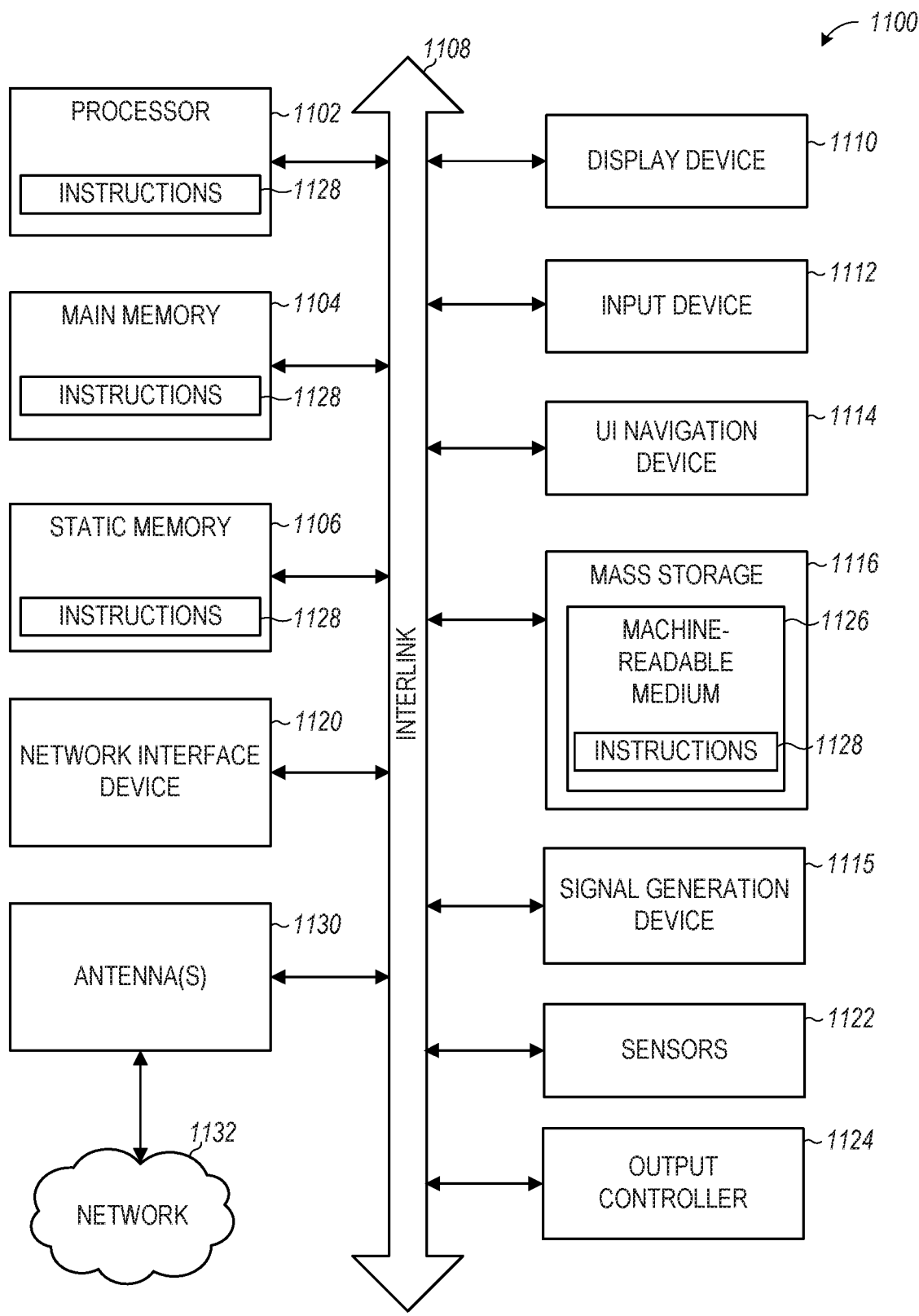
FIG. 11 illustrates a block diagram of an example of a machine upon which one or more embodiments may be implemented.

FIG. 11 illustrates a block diagram of an example of a machine 1100 upon which one or more embodiments may be implemented. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. In sample embodiments, the machine 1100 may be used in embodiments of the collaboration server 220 as well as the user devices 230 (FIG. 2) and may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1100 may serve as a workstation, a front-end server, or a back-end server of a communication system. Machine 1100 may implement the methods described herein (e.g., FIG. 10) by running software that includes instructions that, when processed, implement the methods described herein. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110 (shown as a video display), an alphanumeric input device 1112 (e.g., a keyboard), and a user interface (UI) navigation device 1114 (e.g., a mouse or pen). In an example, the display unit 1110, input device 1112 and UI navigation device 1114 may be a touch screen display. In sample embodiments of the machine 1100, the input device 1112 may include the microphone 360 and/or the video recorder 350. The machine 1100 may additionally include a mass storage device e.g., drive unit) 1116, a signal generation device 1118 (e.g., a speaker), a network interface device 1120, and one or more sensors 1122. Example sensors 1122 include one or more of a global positioning system (GPS) sensor, compass, accelerometer, temperature, light, camera, video camera, sensors of physical states or positions, pressure sensors, fingerprint sensors, retina scanners, or other sensors. The machine 1100 may include an output controller 1124, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1116 may include a machine readable medium 1126 on which is stored one or more sets of data structures or instructions 1128 (e.g., software) embodying or utilized by any one or more of the techniques or functions described herein. The instructions 1128 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the mass storage device 1116 may constitute machine readable media.

While the machine readable medium 1126 is illustrated as a single medium, the term "machine readable medium" may include a single medium or multiple media (e.g., a centralized or distributed database, and/or associated caches and servers) configured to store the one or more instructions 1128. The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1128 may further be transmitted or received over communications network 1132 using a transmission medium via the network interface device 1120. The machine 1100 may communicate with one or more other machines utilizing any one of several transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas 1130 to connect to the communications network 1132. In an example, the network interface device 1120 may include a plurality of antennas 1130 to wirelessly communicate using at least one of single-input multiple-output (SIM), multiple-input multiple-output (MIMO), or multiple-input single-output (MISO) techniques, in some examples, the network interface device 1120 may wirelessly communicate using Multiple User MIMO techniques.

Certain embodiments are described herein as numbered examples 1, 2, 3, etc. These numbered examples are provided as examples only and do not limit the subject technology.

Example 1 is a computer-implemented method of recording and playing back collaborator content selection and manipulation actions and comments during interaction with a document to enhance asynchronous collaboration comprising recording collaborator content selection and manipulation actions and comments during interaction with a document in a first collaboration viewport at a first time, the collaborator content selection and manipulation actions and comments including at least text selection, mouse or pen movements, and voice comments or ink annotations, and playing back the recorded collaborator content selection and manipulation actions while displaying the document in a second collaboration viewport at a second time.

Example 2 is a method as in Example 1, further comprising capturing a screen view and playing backing the collaborator content selection and manipulation actions and comments while displaying the screen view in the second collaboration viewport.

Example 3 is a method as in any preceding Example, wherein the collaborator content selection and manipulation actions and comments are recorded during interaction with the document in the first collaboration viewport for a first form factor on a first device, further comprising formatting the screen view for a second form factor on a second device to enable playing back the recorded collaborator content selection and manipulation actions while viewing the document in the second collaboration viewport on the second device.

Example 4 is a method as in any preceding Example, wherein the collaborator content selection and manipulation actions and comments are recorded during interaction with the document in the first collaboration viewport in a first window, further comprising formatting the screen view for a second window to enable playing back the recorded collaborator content selection and manipulation actions while viewing the document in the second collaboration viewport in the second window.

Example 5 is a method as in any preceding Example, further comprising playing back the recorded collaborator content selection and manipulation actions in the second window while viewing a second instance of the document.

Example 6 is a method as in any preceding Example, wherein recording collaborator content selection and manipulation actions and comments during interaction with a document comprises transcribing a collaborator's voice as content selection and manipulation actions are being made by the collaborator, and wherein playing back the recorded collaborator content selection and manipulation actions while viewing the document comprises playing back the content selection and manipulation actions on the document as the transcribed collaborator's voice is played back.

Example 7 is a method as in any preceding Example, flintier comprising playing back the recorded collaborator content selection and manipulation actions for a particular collaborator independent of content selection and manipulation actions of other collaborators after completion of editing at least a portion of the document.

Example 8 is a system for recording and playing back collaborator content selection and manipulation actions and comments during interaction with a document to enhance asynchronous collaboration comprising a document editor that records collaborator content selection and manipulation actions and comments during interaction with a document in a first collaboration viewport at a first time, the collaborator content selection and manipulation actions and comments including at least text selection, mouse or pen movements, and voice comments or ink annotations, and a viewer that plays back the recorded collaborator content selection and manipulation actions while displaying the document in a second collaboration viewport at a second time.

Example 9 is a system as in Example 8, wherein the document editor captures a screen view and the viewer plays backing the collaborator content selection and manipulation actions and comments while displaying the screen view in the second collaboration viewport.

Example 10 is a system as in Examples 8 and 9, wherein the document editor and viewer are included in a first device having a first form factor, the document editor records collaborator content selection and manipulation actions and comments during interaction with the document in the first collaboration viewport for the first form factor on the first device while the viewer adjusts the screen view for playing back recorded collaborator content selection and manipulation actions recorded in a second device having a second form factor for display on the first device with the first form factor.

Example 11 is a system as in Examples 8-10, wherein the document editor records the collaborator content selection and manipulation actions and comments during interaction with the document in the first collaboration viewport in a first window and the viewer formats the screen view for a second window to enable playing back the recorded collaborator content selection and manipulation actions while viewing the document in the second collaboration viewport in the second window.

Example 12 is a system as in Examples 8-11, wherein the viewer plays back the recorded collaborator content selection and manipulation actions in the second window while viewing a second instance of the document.

Example 13 is a system as in Examples 8-12, wherein the document editor records collaborator content selection and manipulation actions and comments during interaction with a document by transcribing a collaborator's voice as content selection and manipulation actions are being made by the collaborator, and wherein the viewer plays back recorded collaborator content selection and manipulation actions while viewing the document by playing back the content selection and manipulation actions on the document as the transcribed collaborator's voice is played back.

Example 14 is a system as in Examples 8-13, wherein the viewer plays back the recorded collaborator content selection and manipulation actions for a particular collaborator independent of content selection and manipulation actions of other collaborators after completion of editing at least a portion of the document.

Example 15 is a system for recording and playing back collaborator content selection and manipulation actions and comments during interaction with a document to enhance asynchronous collaboration comprising a memory that stores a representation of a document as a string of primitive data structures and update transactions to the primitive data structures, and a collaboration server that manages collaboration on a document by at least two collaborators, the collaboration server receiving recorded collaborator content selection and manipulation actions and comments during interaction with a document by at least one collaborator in a first collaboration viewport at a first time, the collaborator content selection and manipulation actions and comments including at least text selection, mouse or pen movements, and voice comments or ink annotations formatted as strings of primitive data structures and update transactions to the primitive data structures, the collaboration server storing the strings of primitive data structures and update transactions to the primitive data structures in the memory and, upon request, retrieving selected strings of the primitive data structures and update transactions to the primitive data structures for presentation to a viewer that plays back the recorded collaborator content selection and manipulation actions while displaying the document in a second collaboration viewport at a second time.

Example 16 is a system as in Example 15, wherein the recorded collaborator content selection and manipulation actions and comments are timestamped and synchronized for playback.

Example 17 is a system as in Examples 15 and 16, wherein the received recorded collaborator content selection and manipulation actions and comments during interaction with a document by the at least one collaborator in the first collaboration viewport at the first time are recorded in a format of a first device having a first form factor, and wherein the collaboration server further receives viewport, data specifying the format of the first device having the first form factor.

Example 18 is a system as in Examples 15-17, wherein the collaboration server stores the collaborator content selection and manipulation actions as at least one string of update transactions to the primitive string or character data structures and stores the comments as update transactions to a binary large object.

Example 19 is a system as in Examples 15-18, wherein the collaboration server inserts a recording of collaborator content selection and manipulation actions and comments during interaction with the document by the at least one collaborator in the first collaboration viewport at the first time into the document as an interactable element.

Example 20 is a system as in Examples 15-19, wherein the collaboration server retrieves strings of the primitive data structures and update transactions to the primitive data structures for presentation to the viewer upon receipt of an indication that a collaborator has activated the interactable element.

Alternative implementations of the system for recording and playing back collaborator content selection and manipulation actions and comments during interaction with a document to enhance asynchronous collaboration as described herein are contemplated. For example, the system for recording and playing back collaborator content selection and manipulation actions and comments during interaction with a document to enhance asynchronous collaboration as described herein may be implemented within or in association with several products and services besides a collaboration server. Such additional products and services include, for example, editing tools within word processing applications, presentation applications, enterprise management applications, messaging applications, spreadsheet applications, database applications, contacts applications, gaming applications, e-commerce applications, e-business applications, transaction applications, web interface applications, exchange applications, calendaring applications, chat applications, and the like. Thus, the system for recording and playing back collaborator content selection and manipulation actions and comments during interaction with a document to enhance asynchronous collaboration as described herein is not to be limited to the system described in specific examples. These and other implementations are included within the context of the disclosed embodiments as set forth in the following claims.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Also, although the subject matter has been described in language specific to structural features and/or methodological acts, it is to be understood that the subject matter defined in the appended claims is not necessarily limited to the specific embodiments, features, or acts described above. Rather, the specific embodiments, features, and acts described above are disclosed as example forms of implementing the claims. Thus, the following claims are hereby incorporated into the Detailed Description, with a claim standing on its own as a separate embodiment.

What is claimed is:

1. A method of recording and playing back collaborator content selection and manipulation actions and comments during interaction with a document to enhance asynchronous collaboration, comprising:
    storing a representation of a document as a string of primitive data structures and command operations expressing changes to the primitive data structures;
    recording collaborator content selection and manipulation actions and comments during interaction with the document in a first collaboration viewport at a first time, the collaborator content selection and manipulation actions and comments including at least one of an audio or video recording and text selection, mouse or pen movements, or ink annotations formatted as strings of primitive data structures and command operations expressing changes to the primitive data structures;
    inserting a recording of collaborator content selection and manipulation actions and comments during interaction with the document by at least one collaborator in the first collaboration viewport at the first time into the document as an interactable element, the interactable element being activatable by a collaborator to playback the at least one audio or video recording and the text selection, mouse or pen movements, or ink annotations during interaction with the document by the at least one collaborator in the first collaboration viewport at the first time; and upon activation of the interactable element by the collaborator, retrieving selected strings of the primitive data structures and command operations expressing changes to the primitive data structures for the document for playback of the at least one audio or video recording while the command operations are executed for the text selection, mouse or pen movements or ink annotations during interaction with the document by the at least one collaborator to illustrate changes made to the document in a second collaboration viewport at a second time.

2. A method as in claim 1, further comprising capturing a screen view and playing back the collaborator content selection and manipulation actions and comments while displaying the screen view in the second collaboration viewport.

3. A method as in claim 2, wherein the collaborator content selection and manipulation actions and comments are recorded during interaction with the document in the first collaboration viewport for a first form factor on a first device, the method further comprising formatting the screen view for a second form factor on a second device to enable playing back the recorded collaborator content selection and manipulation actions while viewing the document in the second collaboration viewport on the second device.

4. A method as in claim 2, wherein the collaborator content selection and manipulation actions and comments are recorded during interaction with the document in the first collaboration viewport in a first window, the method further comprising formatting the screen view for a second window to enable playing back the recorded collaborator content selection and manipulation actions while viewing the document in the second collaboration viewport in the second window.

5. A method as in claim 4, further comprising playing back the recorded collaborator content selection and manipulation actions in the second window while viewing a second instance of the document.

6. A method as in claim 1, wherein recording collaborator content selection and manipulation actions and comments during interaction with a document comprises transcribing a collaborator's voice as content selection and manipulation actions are being made by the collaborator, and wherein playing back the recorded collaborator content selection and manipulation actions while viewing the document comprises playing back the content selection and manipulation actions on the document as the transcribed collaborator's voice is played back.

7. A method as in claim 1, further comprising playing back the recorded collaborator content selection and manipulation actions for a particular collaborator independent of content selection and manipulation actions of other collaborators after completion of editing at least a portion of the document.

8. A device that records and plays back collaborator content selection and manipulation actions and comments during interaction with a document to enhance asynchronous collaboration, comprising:
an instruction memory that stores instructions;
a memory that stores a representation of a document as a string of primitive data structures and command operations expressing changes to the primitive data structures; and
one or more processing devices that execute the instructions to perform operations including:
implementing a document editor that records collaborator content selection and manipulation actions and comments during interaction with the document in a first collaboration viewport at a first time and inserts a recording of collaborator content selection and manipulation actions and comments during interaction with the document by at least one collaborator in the first collaboration viewport at the first time into the document as an interactable element, the interactable element being activatable by a collaborator to playback at least one audio or video recording and a text selection, mouse or pen movements, or ink annotations during interaction with the document by the at least one collaborator in the first collaboration viewport at the first time, and the collaborator content selection and manipulation actions and comments including at least one of the audio or video recording and text selection, mouse or pen movements, or ink annotations formatted as strings of primitive data structures and command operations expressing changes to the primitive data structures; and
implementing a viewer that, upon activation of the interactable element by the collaborator, retrieves selected strings of the primitive data structures and command operations expressing changes to the primitive data structures for the document from the memory for playback of the at least one audio or video recording while the command operations are executed for the text selection, mouse or pen movements, or ink annotations during interaction with the document by the at least one collaborator to illustrate changes made to the document in a second collaboration viewport at a second time.

9. A system as in claim 8, wherein the document editor captures a screen view and the viewer plays back the collaborator content selection and manipulation actions and comments while displaying the screen view in the second collaboration viewport.

10. A system as in claim 9, wherein the document editor and viewer are included in a first device having a first form factor, the document editor records collaborator content selection and manipulation actions and comments during interaction with the document in the first collaboration viewport for the first form factor on the first device while the viewer adjusts the screen view for playing back recorded collaborator content selection and manipulation actions recorded in a second device having a second form factor for display on the first device with the first form factor.

11. A system as in claim 9, wherein the document editor records the collaborator content selection and manipulation actions and comments during interaction with the document in the first collaboration viewport in a first window and the viewer formats the screen view for a second window to enable playing back the recorded collaborator content selection and manipulation actions while viewing the document in the second collaboration viewport in the second window.

12. A system as in claim 11, wherein the viewer plays back the recorded collaborator content selection and manipulation actions in the second window while viewing a second instance of the document.

13. A system as in claim 8, wherein the document editor records collaborator content selection and manipulation actions and comments during interaction with a document by transcribing a collaborator's voice as content selection and manipulation actions are being made by the collaborator, and wherein the viewer plays back recorded collaborator content selection and manipulation actions while viewing the document by playing back the content selection and manipulation actions on the document as the transcribed collaborator's voice is played back.

14. A system as in claim 8, wherein the viewer plays back the recorded collaborator content selection and manipulation actions for a particular collaborator independent of content selection and manipulation actions of other collaborators after completion of editing at least a portion of the document.

15. A system for recording and playing back collaborator content selection and manipulation actions and comments during interaction with a document to enhance asynchronous collaboration, comprising:
   a memory that stores a representation of a document as a string of primitive data structures and command operations expressing changes to the primitive data structures; and
   a collaboration server that manages collaboration on the document by at least two collaborators, the collaboration server receiving recorded collaborator content selection and manipulation actions and comments during interaction with the document by at least one collaborator in a first collaboration viewport at a first time and inserting a recording of collaborator content selection and manipulation actions and comments during interaction with the document by the at least one collaborator in the first collaboration viewport at the first time into the document as an interactable element, the interactable element being activatable by a collaborator to playback at least one audio or video recording and a text selection, mouse or pen movements, or ink annotations during interaction with the document by the at least one collaborator in the first collaboration viewport at the first time, and, the collaborator content selection and manipulation actions and comments including at least one of the audio or video recording and text selection, mouse or pen movements, or ink annotations formatted as strings of primitive data structures and command operations expressing changes to the primitive data structures, the collaboration server storing the strings of primitive data structures and command operations expressing changes to the primitive data structures in the memory and, upon activation of the interactable element by the collaborator, retrieving selected strings of the primitive data structures and command operations expressing changes to the primitive data structures for presentation to a viewer that plays back the at least one audio or video recording while the command operations are executed for the text selection, mouse or pen movements, or ink annotations during interaction with the document by the at least one collaborator to illustrate changes made to the document in a second collaboration viewport at a second time.

16. A system as in claim 15, wherein the recorded collaborator content selection and manipulation actions and comments are timestamped and synchronized for playback.

17. A system as in claim 15, wherein the received recorded collaborator content selection and manipulation actions and comments during interaction with a document by the at least one collaborator in the first collaboration viewport at the first time are recorded in a format of a first device having a first form factor, and wherein the collaboration server further receives viewport data specifying the format of the first device having the first form factor.

18. A system as in claim 15, wherein the collaboration server stores the collaborator content selection and manipulation actions as at least one string of command operations expressing changes to the primitive string or character data structures and stores the comments as command operations expressing changes to a binary large object.

* * * * *